United States Patent [19]

Green et al.

[11] Patent Number: 5,688,402

[45] Date of Patent: Nov. 18, 1997

[54] SELF-CLEANING STRAINER

[75] Inventors: Thomas A. Green, San Jose, Calif.; Alan J. Bilanin, Princeton, N.J.

[73] Assignee: General Electric Company, San Jose, Calif.

[21] Appl. No.: 572,917

[22] Filed: Dec. 15, 1995

[51] Int. Cl.$^6$ .......................... B01D 29/64; B01D 35/02; B01D 35/027; G21C 19/307
[52] U.S. Cl. .......................... 210/355; 210/408; 210/415; 210/416.1; 210/460; 376/313
[58] Field of Search .................................. 210/355, 415, 210/460, 416.1, 416.2, 408; 376/313

[56] References Cited

U.S. PATENT DOCUMENTS

| | | |
|---|---|---|
| 192,103 | 6/1877 | Watson . |
| 192,313 | 6/1877 | Watson . |
| 554,312 | 2/1896 | Robinson . |
| 625,131 | 5/1899 | Abbott . |
| 661,602 | 11/1900 | Garesche . |
| 664,833 | 1/1901 | Collins . |
| 683,386 | 9/1901 | Corlett . |
| 748,251 | 12/1903 | Allen . |
| 776,550 | 12/1904 | Rice . |
| 925,040 | 6/1909 | Sennott . |
| 969,364 | 9/1910 | Groctenhuis . |
| 1,033,745 | 7/1912 | Smith . |
| 1,139,033 | 5/1915 | Herbstriet . |
| 1,443,918 | 1/1923 | King . |
| 1,741,444 | 12/1929 | Slider . |
| 1,961,412 | 6/1934 | Bjorklund . |
| 2,089,702 | 8/1937 | Lonax . |
| 2,332,965 | 10/1943 | Ducommun . |
| 2,776,055 | 1/1957 | Adler . |
| 4,839,046 | 6/1989 | Chandler . |
| 4,902,412 | 2/1990 | Surber . |
| 5,426,679 | 6/1995 | Hendriksson . |
| 5,453,180 | 9/1995 | Hendriksson . |

FOREIGN PATENT DOCUMENTS

| | | |
|---|---|---|
| 522607 | 3/1956 | Canada . |
| 85089 | 6/1958 | Finland . |
| 3833807 | 4/1990 | Germany . |
| 57-113815 | 7/1982 | Japan . |
| 61-263613 | 11/1986 | Japan . |
| 42472 | 11/1915 | Sweden . |
| 792613 | 4/1958 | United Kingdom . |

*Primary Examiner*—Thomas M. Lithgow
*Attorney, Agent, or Firm*—James E. McGinness

[57] ABSTRACT

A self-cleaning, self-propelled strainer designed for installation in boiling water reactor suppression pools. The strainer is designed to prevent strainer clogging and subsequent loss of the emergency core cooling system flow during a postulated design basis loss-of-coolant accident. This self-cleaning strainer is driven by a turbine placed in the strainer flow path. The turbine drives rotation of a brush-and-plow arrangement. The wiping action of the brush and the centrifuging action of the plow remove insulation debris and other particulate matter which might be generated by the LOCA, thereby preventing the strainer from plugging.

14 Claims, 4 Drawing Sheets

SELF-CLEANING STRAINER

FIELD OF THE INVENTION

This invention relates generally to systems for supplying liquid from a storage facility, such as a storage tank or pool. In particular, the invention relates to emergency systems for cooling the nuclear fuel core following a postulated accident.

BACKGROUND OF THE INVENTION

Boiling water reactors have conventionally utilized active safety systems to control and mitigate accident events. Those events varied from small break to design basis accidents. In particular, the current BWR designs utilize active operational principles for the key safety system employed to provide emergency coolant injection, for assured core cooling over the design basis post-LOCA lifetime.

Referring to FIG. 1, a typical BWR includes a reactor pressure vessel 2 containing a nuclear reactor fuel core 4 submerged in water 6. The fuel core heats the water to generate steam 6a which is discharged from the reactor pressure vessel through a main steam line 8 and used to power a steam turbine-generator (not shown) for producing electrical power. The reactor pressure vessel is located inside the drywell 12, which is in turn surrounded by a containment vessel 10. The containment vessel is typically a concrete structure having a steel liner and is designed to withstand elevated pressure. The drywell 12 typically contains a noncondensable gas such as nitrogen or air.

In accordance with a conventional BWR design, a weir wall 14 is arranged inside the drywell. The space between the drywell wall and the weir wall is in fluid communication with the space between the drywell wall and the containment wall, as shown in FIG. 1, via openings 30. These spaces define a suppression chamber which is partially filled with water to form the suppression pool 16. The suppression pool serves various functions, including being a heat sink in the event of certain accidents. For example, one type of accident designed for is a loss-of-coolant accident (LOCA) in which steam or liquid from the reactor pressure vessel 2 leaks into the drywell. Following the LOCA, the reactor is shut down, but steam and residual decay heat continue to be generated following the shutdown. When the pressure inside the drywell 12 reaches a magnitude such that the water level in the space between the weir wall 14 and the drywell wall falls to the elevation of the top of the topmost opening 30, the steam from the drywell 12 flows through the opening and into the suppression pool 16, where the steam is cooled by contact with the water in the pool.

The suppression pool 16 is in fluid communication with an inlet of a pump 20 via pump suction piping 18. The outlet of pump 20 is connected to piping in the reactor pressure vessel 2 via a valve 22 and outlet piping 26. Following a LOCA, the valve 22 is opened by valve control means 24 and pump 30 is turned on to pump water from the suppression pool 16 into the reactor pressure vessel 2 for cooling the core 4. The pump suction piping 18 penetrates the containment wall 10 and extends several feet into the suppression pool 16. The end of piping 18 has a flange for mounting a suction strainer 28, which covers the inlet of piping 18. The suction strainer 28 comprises means for preventing fibrous matter, particulates and other miscellaneous debris suspended in the suppression pool water, from being sucked into piping 18 and then pumped into the reactor pressure vessel 2.

The strainer 28, pump suction piping 18, pump 20, valve 22 and outlet piping 26 form part of the emergency core cooling system (ECCS). An emergency core cooling system can be designed with multiple flow paths for pumping suppression pool water into the reactor pressure vessel.

Experience has shown the potential vulnerability of the ECCS suction strainers to plugging. In the postulated design basis LOCA, a significant quantity of fibrous material from different sources, for example, fiberglass thermal insulation from piping, may be transported to the suppression pool 16. This fibrous material could precoat the strainer 28 and act as an effective filtering medium for particulate matter (e.g., rust or paint chips) in the pool. The particulate matter will become suspended in the suppression pool water as a result of the accident conditions and could transport to the strainer. Once the strainers are plugged, the ECCS flow will be reduced. The potential also exists for loss of net positive suction head (i.e., the minimum pressure needed on the suction side for the pump to operate) and subsequent disabling of the emergency core cooling system. The design basis for the LOCA requires that long-term cooling be maintained.

Thus, there is a need for a suction strainer design which will not become plugged. Also, any new strainer must be robust enough to withstand the suppression pool dynamic loads and appropriate to filter out the types of fibrous and particulate matter likely to be found in the suppression pool water.

SUMMARY OF THE INVENTION

The present invention is a self-cleaning, self-propelled strainer designed for installation in boiling water reactor (BWR) suppression pools. The strainer is designed to prevent strainer clogging and subsequent loss of the emergency core cooling system (ECCS) flow during a postulated design basis loss-of-coolant accident (LOCA).

The self-cleaning strainer of the present invention comprises a rotatable brush-and-plow arrangement. The wiping action of the brush and the centrifuging action of the plow, during their concurrent rotation, remove fibrous insulation debris and other particulate matter which are suspended in the suppression pool water as a result of the LOCA and then accumulate on the perforated face of the strainer. The constant removal of debris from the perforated face of the strainer prevents the strainer from plugging.

In accordance with the preferred embodiment of the invention, the brush is designed to gather fibrous and/or particulate material from the perforated plate of the strainer. Once a sufficient amount of debris has been collected on the brush, large clumps periodically break away from the brush. These clumps are then moved by the plow to a low-velocity area where the debris can settle away from the strainer influent.

In accordance with a further feature of the invention, the brush-and-plow arrangement is driven by a turbine placed in the strainer flow path. The strainer in accordance with the preferred embodiment utilizes a flow reducer, the smaller-diameter portion of which serves as the turbine housing. The flow reducer increases the water flow velocity through the turbine and provides the necessary torque to the brush/plow assembly to remove the debris from the strainer. In the alternative, the turbine can be installed internal to the pump suction piping, which enables the axial length of the strainer to be reduced.

DETAILED DESCRIPTION OF THE PREFERRED EMBODIMENTS

Figure 1:
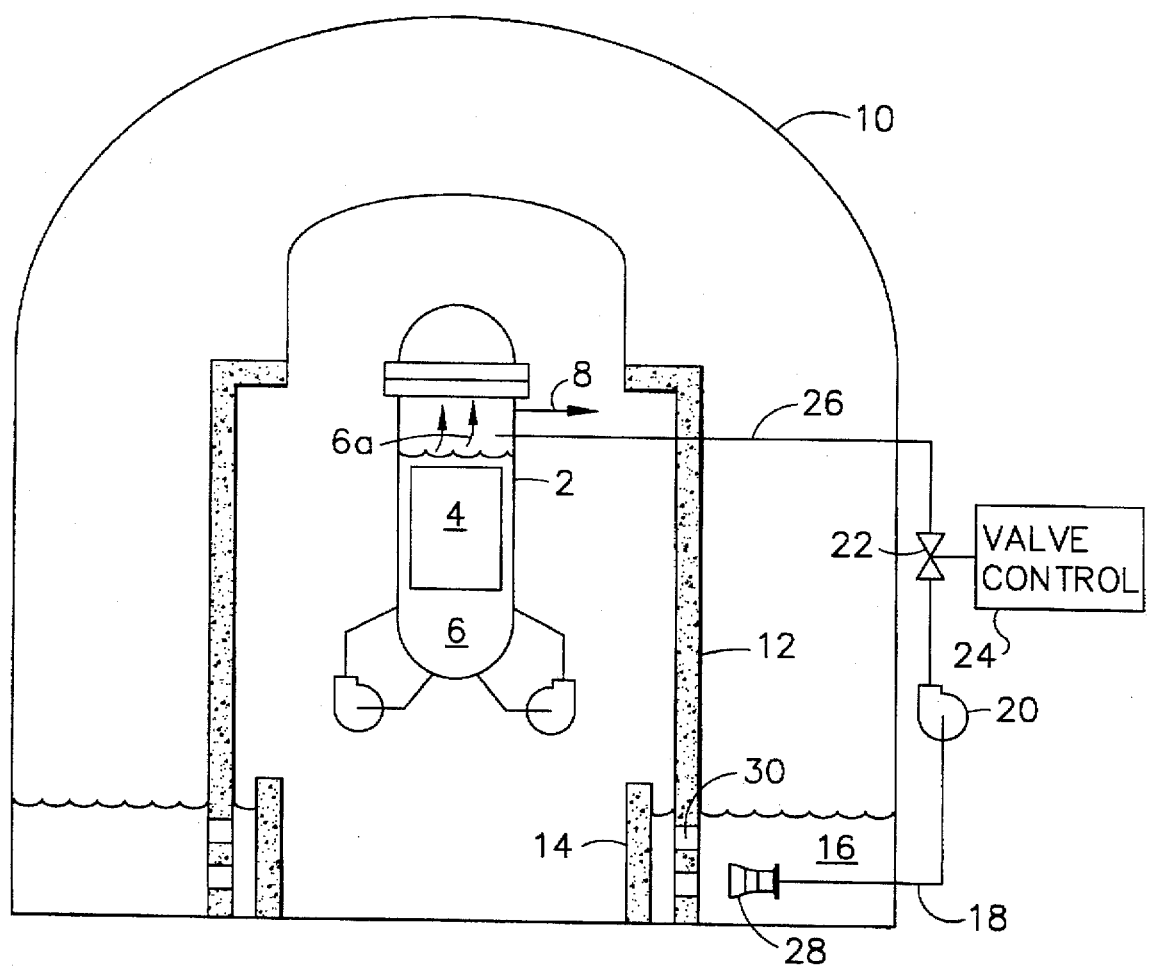
FIG. 1 is a schematic diagram showing a reactor pressure vessel connected to a suppression pool of an emergency core cooling system.
Figure 2:
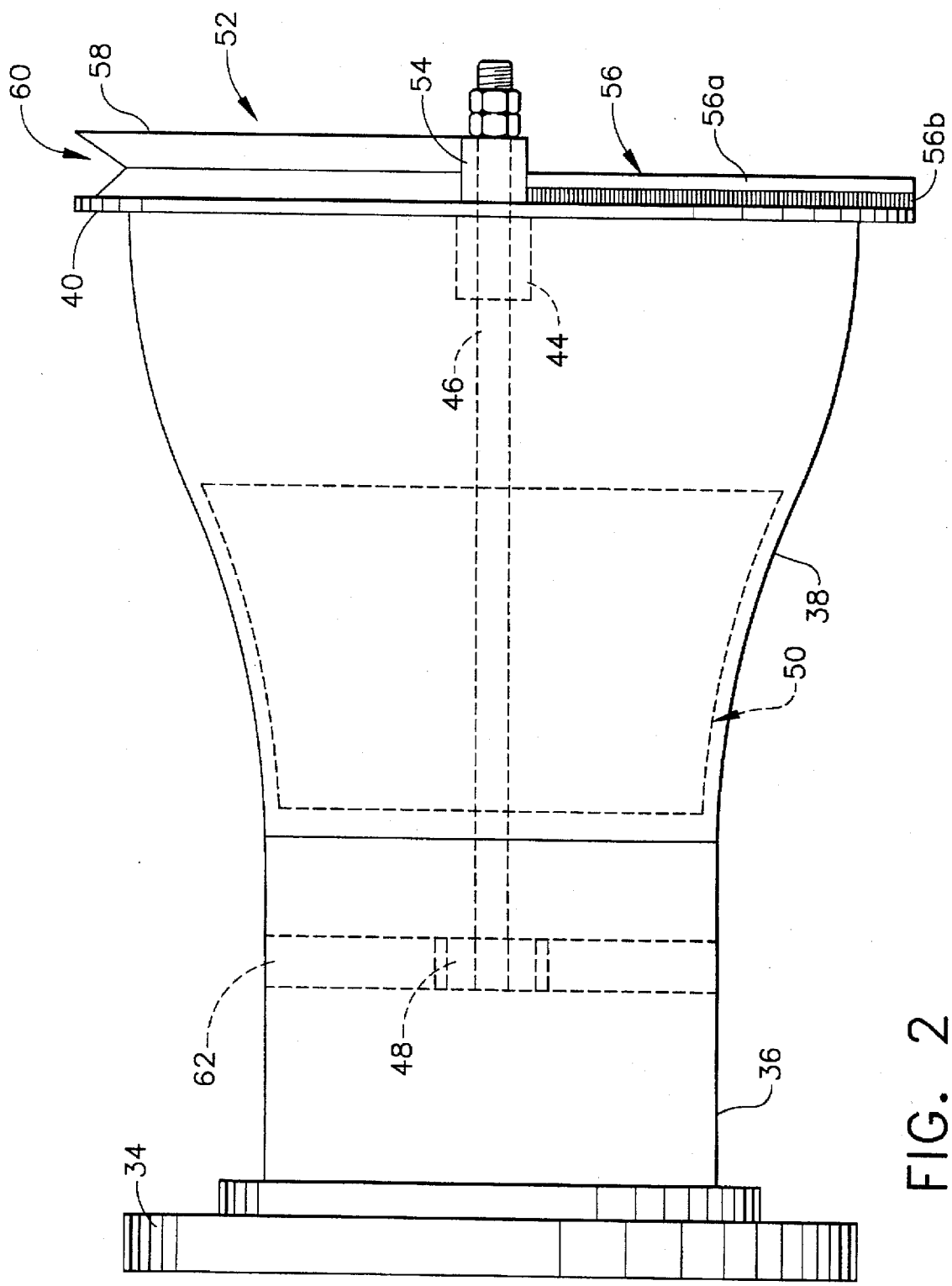
FIG. 2 is a schematic diagram showing a side view of a self-cleaning strainer in accordance with one preferred embodiment of the invention.
Figure 3:
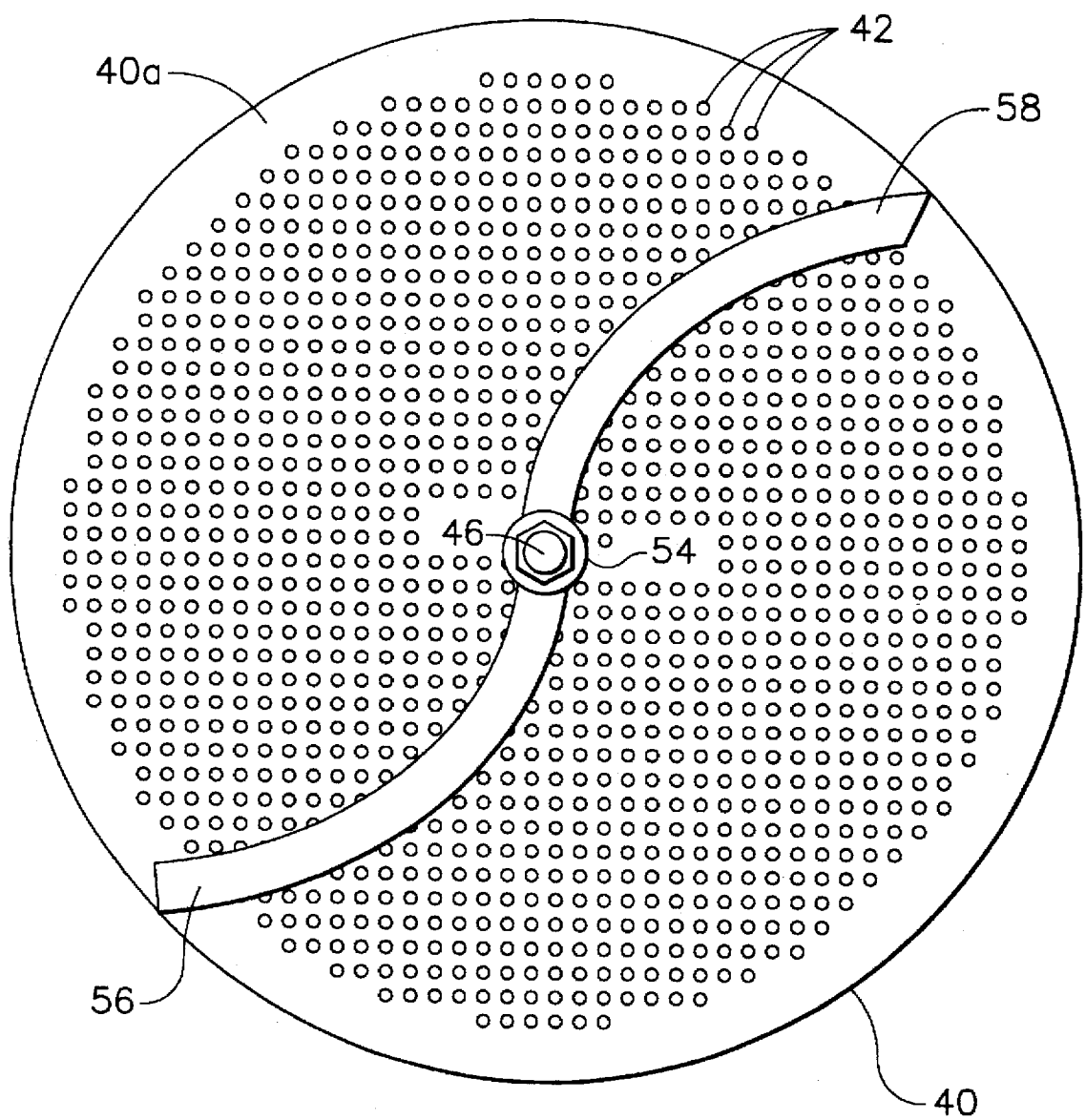
FIG. 3 is a schematic diagram showing an end view of the self-cleaning strainer shown in FIG. 2.

Referring to FIG. 2, the self-cleaning strainer in accordance with a first preferred embodiment of the invention is mounted on the inlet end of the pump suction piping (18 in FIG. 1) via a flange 34, which is bolted to a flange on the pump suction piping. The strainer assembly further comprises a circular cylindrical pipe 36 of diameter equal to that of the pump suction piping. Pipe 36 has one end welded to flange 34 and the other end welded to a flow reducer 38. The pipe 36 and flow reducer 38 are coaxial, with the flow reducer increasing in diameter in the axial direction away from pipe 36. The larger-diameter end of flow reducer 38 is welded to a perforated end plate 40. As seen in FIG. 3, end plate 40 has a central area of spaced perforations 42 surrounded by a non-perforated peripheral area 40a, hereinafter referred to as the scraper skirt.

The perforated end plate 40 is oriented perpendicular to the axis of flow reducer 38. The perforations 42 are sized so that end plate 40 acts as a screen to block passage of fibrous material, particulates and other miscellaneous debris into the flow reducer, and ultimately into the reactor pressure vessel. End plate 40 has a central opening in which a bearing bushing 44 is securely seated. The bearing bushing 44 rotatably supports one end of a drive shaft 46. The other end of drive shaft 46 is rotatably supported by a bearing bushing 48. Bearing bushing 48 is in turn supported by a vane assembly 62, the function of which is discussed hereinbelow. The bearing bushings 44 and 48 are mounted so that the drive shaft 46 is coaxial with the flow reducer 38.

A turbine 50 is securely mounted on the drive shaft 46 along an intermediate portion between the bearing bushings 44 and 48. FIG. 2 depicts the turbine 50 as being positioned within the small-diameter end of the flow reducer 38. However, it should be understood that the present invention does not require that the turbine 50 be located inside the flow reducer. On the contrary, the drive shaft 46 may be extended in the axial direction toward the pump (20 in FIG. 1) and turbine 50 may be mounted on the drive shaft extension at a location within pipe 36 or even further downstream, at a location within the pump suction piping (18 in FIG. 1).

In accordance with the preferred embodiment of the invention shown in FIG. 2, the blades of the turbine 50 are contoured in an axial direction to conform to the shape of the interior of the narrow-diameter end of the flow reducer. In addition, the blades are disposed at an oblique angle relative to the water flowing down-stream in the flow reducer and toward the pump 20 (see FIG. 1). The circumferential component of the force exerted on the turbine blades by the axially flowing water causes the turbine 50, and thus the drive shaft 46, to rotate.

The distal end of the rotating drive shaft has a brush-and-plow arrangement 52 securely mounted thereon. As best seen in FIG. 3, the brush-and-plow arrangement comprises an annular bushing 54 securely mounted on the drive shaft 46, a curved brush 56 having one end welded to the outer circumference of bushing 54, and a curved plow 58 having one end welded to the outer circumference of bushing 54 at a point diametrally opposed to the brush/bushing weld joint.

The brush 56 comprises a curved stainless steel arm 56a having a multiplicity of parallel stainless steel bristle assemblies 56b welded thereto. The brush 56 is disposed so that the distal ends of the bristle assemblies 56b brush along the surface of the perforated end plate 40. Preferably, the brush has a radial extent such that the tip of the brush travels along a circle having a radius greater than the radius of the perforated central area of end plate 40. The curved plow 58 has a V-shaped channel 60 formed along its convex face and running from one end of the plow to the other end. The plow 58 also has a radial extent such that the plow tip travels along a circle having a radius greater than the radius of the perforated central area of end plate 40.

When pump 20 (see FIG. 1) is turned on, water is sucked from the suppression pool 16 into the flow reducer 38 (see FIG. 2) via the perforations 42 in end plate 40. As the diameter of the flow reducer narrows in the direction of flow, the water flow velocity increases. This relatively higher-velocity water flows through the turbine 50, causing the turbine, drive shaft and brush-and-plow assembly to rotate in unison. Because the turbine produces undesirable turbulence in the water flowing into the pump suction piping, a lattice of vanes 62 is placed in the flow downstream of the turbine to act as a flow straightener, i.e., to make the flow less turbulent. The lattice also supports the bearing bushing 44. Vanes 62 are disposed parallel to the axis of pipe 36.

As the brush-and-plow assembly is rotated in a counter-clockwise direction (as seen in FIG. 3), the bristle assemblies 56b of brush 56 wipe the face of the perforated end plate 40. During this wiping action, the brush gathers fibrous matter, particulates and other miscellaneous debris which have accumulated on the surface of end plate 40. Once a sufficient amount of debris has been collected on the brush, large clumps periodically break away from and pass over the rotating brush. These clumps are then received in the V-shaped channel 60 of plow 58 and are radially pumped outward by the centrifugal force of the rotating plow. When the clumps of debris pass beyond the radial limit of the plow tip, the debris is left to drift in a low-velocity area in front of the scraper skirt 40a, where the debris can settle away from the strainer influent. As a result of the wiping action of the brush and the centrifuging action of the plow, the face of the end plate is kept free of debris which might otherwise accumulate until the strainer became clogged.

The self-cleaning, self-propelling strainer of the present invention is designed with sufficient structural rigidity to withstand the suppression pool loads that are developed during a design basis LOCA. In particular, the brush 56 is made of stainless steel wire (bristle assemblies 56b) welded to a stainless steel arm 56a. Likewise the centrifuging plow 58, turbine 50 and drive shaft 46 are all made of stainless steel.

The initial test unit strainer housing employed a 16-inch ×10-inch flow reducer. The turbine—which provides the torque to drive the brush/plow assembly—was located in the 10-inch section of the reducer. In this location, the turbine is more efficient hydrodynamically and can provide the necessary torque to drive the brush/plow assembly.

Furthermore, in accordance with the present invention, the brush/plow configuration is specifically developed to remove the mixed media (fiber/corrosion product) likely to be found in suppression pool water under post-LOCA conditions. The brush is in continuous contact with the perforated plate which acts as the strainer. The brush prevents any buildup of the fibrous insulation which is removed from the water stream. As the insulation mound builds up, it falls off and is captured by the plow. The purpose of the curved plow is to act as a pump which centrifuges radially outward. Any insulation in front of the plow. Large clumps of insulation which exceed the clearance of the plow are caught up by the plow and pumped outward to the skirt, where suction velocities are less than the settling velocity of the insulation clump.

A ½-scale geometric prototype with full-scale water approach velocities (over 1 ft/sec) has been developed and tested. This testing showed that the fiber builds up in front of the brush until the height of the fiber mound exceeds the brush height. The mound then breaks away from the brush and is then caught by the plow and pumped radially outward away from the strainer. The mound then settled under gravity to the bottom of the pool.

Testing of this machine required about 10 ft-lb of torque to rotate at 40 rpm and continuously clean fiber in the test pool. The fiber concentrations were typical of what might be expected in a suppression pool during a design basis LOCA. Scaling suggests that a full-scale self-cleaning machine with a strainer diameter of 36 inches will require approximately 50 ft-lb of torque and would rotate at about 18 rpm.

The power required by the turbine would cause a pressure drop across the turbine of less than 1 foot of water. Pressure drops across the ½-scale self-cleaning strainer turbine have been measured to be of the order of ½ foot of water.

Figure 4:
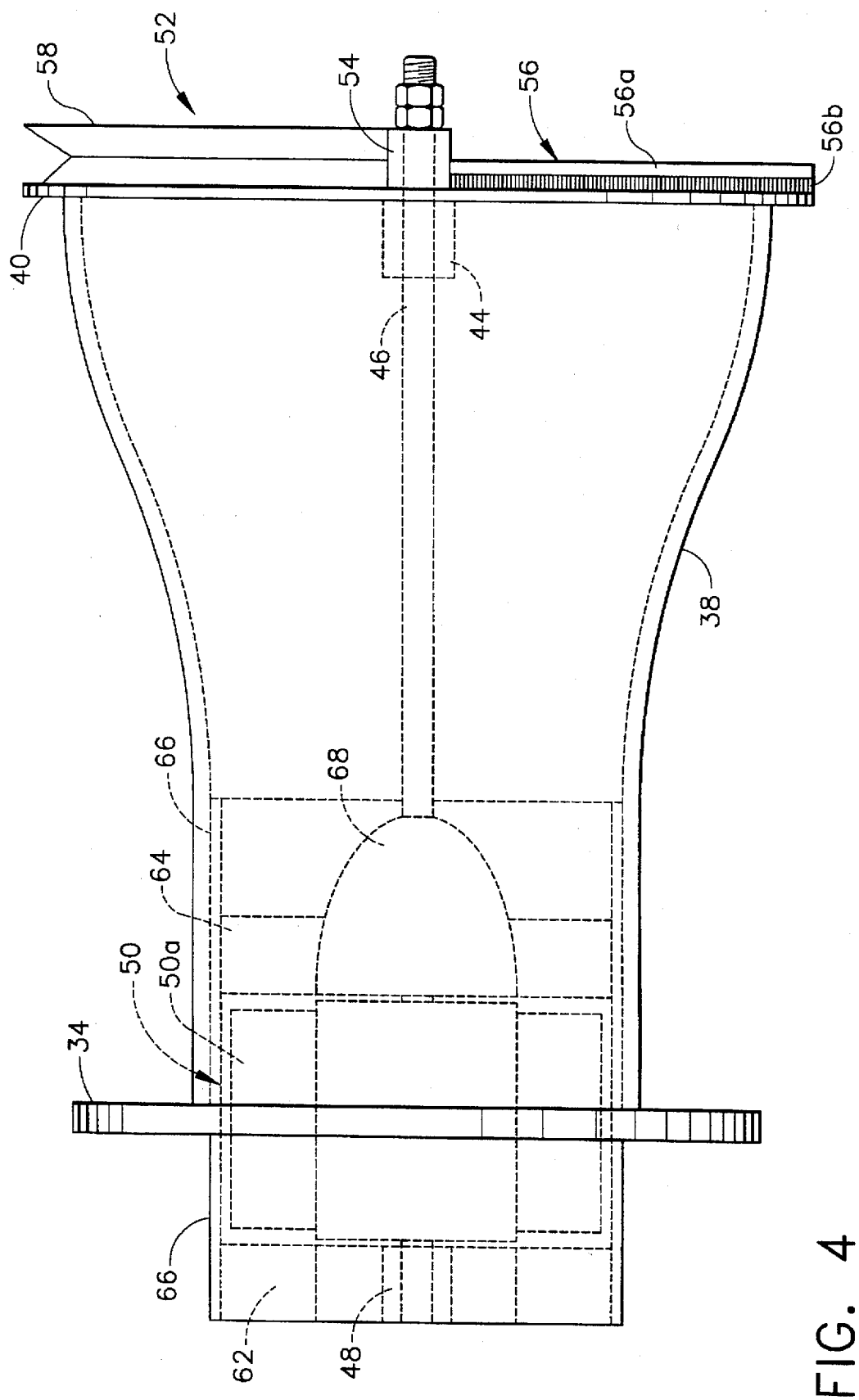
FIG. 4 is a schematic diagram showing a side view of a self-cleaning strainer in accordance with another preferred embodiment of the invention.

An alternative preferred embodiment of the invention is shown in FIG. 4. This embodiment differs from the embodiment of FIG. 2 in the configuration of the turbine and vane assemblies. In particular, the second preferred embodiment incorporates a turbine/vane module which can be installed in the strainer assembly. The turbine/vane module comprises a circular cylindrical pipe shroud 66 which supports the lattice of flow-straightening vanes 62 downstream of the turbine 50 and a pre-rotating whirl vane assembly, comprising a plurality of vanes 64 and a nose cone 68, upstream of the turbine. The whirl vanes 64 redirect the flow of water so that the water impinges on the blades 50a of turbine 50 at an angle such that greater torque is applied to the turbine than would otherwise be the case if the water were to enter the turbine as strictly axial flow.

The preferred embodiments of the invention have been disclosed for the purpose of illustration. Variations and modifications which do not depart from the broad concept of the invention will be readily apparent to those skilled in the pertinent arts. All such variations and modifications are intended to be encompassed by the claims set forth hereinafter.

We claim:

1. A self-cleaning strainer comprising:

a conduit having an outlet, an axis and an inlet;

a perforated end plate disposed across said conduit inlet, said end plate having a central aperture;

a drive shaft rotatably supported by bearings such that an axis of rotation of said drive shaft is coaxial with said conduit axis, said drive shaft having a portion inside said conduit and a portion which extends through said perforated end plate central aperture and outside said conduit;

a turbine coupled to said portion of said drive shaft inside said conduit for rotation therewith, said turbine comprising blades having surfaces which are oriented to cause rotation of said turbine and said drive shaft when liquid flows from said conduit inlet to said conduit outlet;

a brush coupled to said portion of said drive shaft outside said conduit for rotation therewith, said brush comprising a multiplicity of bristles which wipe said perforated end plate during rotation of said drive shaft; and a plow coupled to said portion of said drive shaft outside said conduit for rotation therewith, wherein said plow has a channel which extends along its length and said channel has a V-shaped cross section.

2. A self-cleaning strainer comprising:

a conduit having an outlet, an axis and an inlet;

a perforated end plate disposed across said conduit inlet, said end plate having a central aperture;

a drive shaft rotatably supported by bearings such that an axis of rotation of said drive shaft is coaxial with said conduit axis, said drive shaft having a portion inside said conduit and a portion which extends through said perforated end plate central aperture and outside said conduit;

a turbine coupled to said portion of said drive shaft inside said conduit for rotation therewith, said turbine comprising blades having surfaces which are oriented to cause rotation of said turbine and said drive shaft when liquid flows from said conduit inlet to said conduit outlet;

a brush coupled to said portion of said drive shaft outside said conduit for rotation therewith, said brush comprising a multiplicity of bristles which wipe said perforated end plate during rotation of said drive shaft;

a plow coupled to said portion of said drive shaft outside said conduit for rotation therewith; and a bushing fixedly mounted on said drive shaft, one end of said brush being welded to said bushing and one end of said plow being welded to said bushing at a point generally diametrally opposite to a point at which said brush and said bushing are welded.

3. The self-cleaning strainer as defined in claim 2, wherein said plow has a channel which extends along its length.

4. The self-cleaning strainer as defined in claim 2, wherein said perforated end plate is perpendicular to said axis of rotation of said drive shaft and comprises a perforated central area and a non-perforated skirt surrounding said central area.

5. The self-cleaning strainer as defined in claim 2, wherein one of said bearings is mounted to said perforated end plate.

6. The self-cleaning strainer as defined in claim 2, wherein said brush comprises a curved arm, each of said multiplicity of bristles having one end welded to said curved arm.

7. The self-cleaning strainer as defined in claim 2, wherein said conduit comprises a flow reducer having a section of first radius and a section of second radius, said first radius being greater than said second radius, and said turbine being housed in said flow reducer section of second radius.

8. The self-cleaning strainer as defined in claim 2, further comprising a flange for attaching said conduit outlet to an inlet of a pipe.

9. The self-cleaning strainer as defined in claim 8, wherein said conduit comprises a pipe shroud which extends on both sides of said flange, said turbine being located inside said pipe shroud.

10. A system for supplying liquid, comprising:

a vessel designed to hold a pool of liquid, said vessel comprising a side wall;

a penetration pipe which penetrates said side wall, said penetration pipe having an inlet located inside said vessel; and a self-cleaning strainer assembly coupled to said penetration pipe inlet and comprising a perforated end plate, rotatable cleaning means for displacing debris accumulated on a surface of said perforated end plate, and means for propelling said rotatable cleaning means to rotate in response to liquid flowing from said pool to said penetration pipe through said propelling means, wherein said rotatable cleaning means comprise:

a drive shaft extending through a central aperture in said perforated end plate, said drive shaft being supported by bearings and coupled to said propelling means;

a brush coupled to said drive shaft for rotation therewith, said brush comprising a multiplicity of bristles which wipe said perforated end plate during rotation of said drive shaft;

a plow coupled to said drive shaft for rotation therewith; and a bushing fixedly mounted on said drive shaft, one end of said brush being welded to said bushing and one end of said plow being welded to said bushing at a point generally diametrally opposite to a point at which said brush and said bushing are welded.

11. The liquid supply system as defined in claim 10, wherein said propelling means comprise a turbine coupled to said drive shaft for rotation therewith, said turbine comprising a plurality of blades having surfaces which are oriented to cause rotation of said turbine and said drive shaft when liquid flows from said pool to said penetration pipe through said propelling means.

12. The liquid supply system as defined in claim 10, wherein said plow has a channel which extends along its length.

13. The liquid supply system as defined in claim 10, wherein said perforated end plate is perpendicular to said axis of rotation of said drive shaft and comprises a perforated central area and a non-perforated skirt surrounding said central area.

14. The liquid supply system as defined in claim 10, wherein said brush comprises a curved arm, each of said multiplicity of bristles having one end welded to said curved arm.

* * * * *